July 3, 1956  S. MALACHEK  2,753,409
TURN SIGNAL SWITCH
Filed March 26, 1954  2 Sheets-Sheet 1

INVENTOR.
Steven Malachek
BY
McMorrow, Berman + Davidson
ATTORNEYS

July 3, 1956 S. MALACHEK 2,753,409
TURN SIGNAL SWITCH
Filed March 26, 1954 2 Sheets-Sheet 2
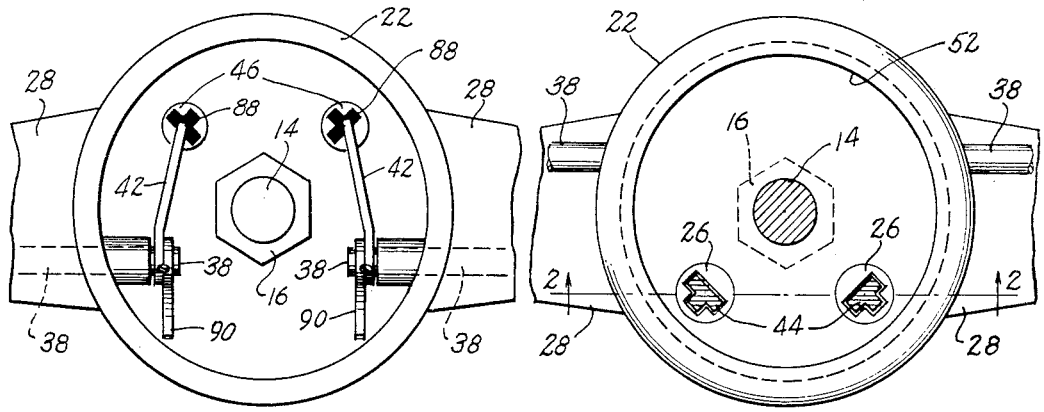
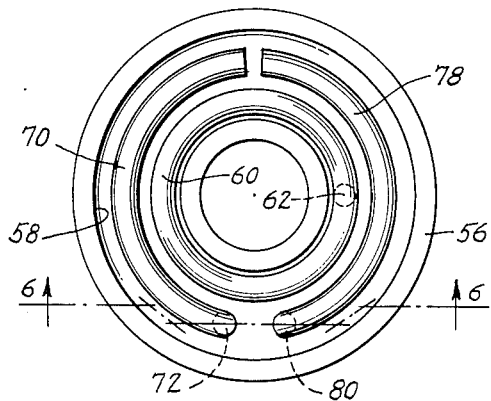
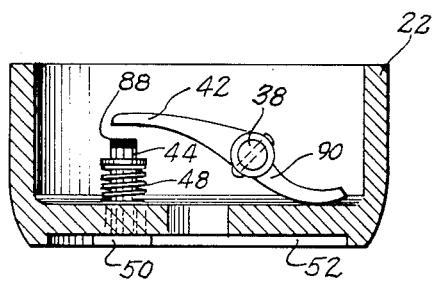
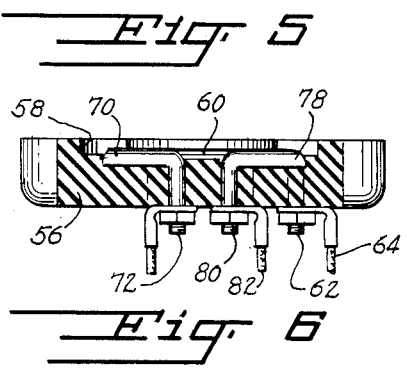
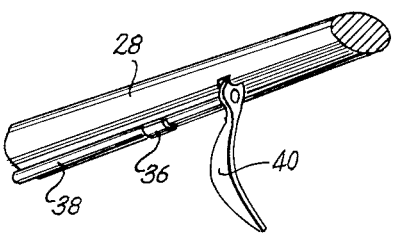
INVENTOR.
Steven Malachek
BY
McMorrow, Berman & Davidson
ATTORNEYS

United States Patent Office 2,753,409
Patented July 3, 1956

2,753,409

TURN SIGNAL SWITCH

Steven Malachek, Cleveland, Ohio

Application March 26, 1954, Serial No. 418,816

2 Claims. (Cl. 200—61.27)

This invention relates to a turn signal switch and has for its primary object to actuate a turn signal to indicate when a vehicle is about to make a turn out of the lane of traffic in which it is traveling.

Another object is to contribute to the safety of the operation of the vehicle by enabling the turn signal to be energized without requiring that the operator of the vehicle remove his hand from the steering wheel.

A further object is to place the turn signal control mechanism at a location in which the driver of a vehicle may readily select the signal to be actuated and retain the signal in operation while making the turn.

A further object is to automatically discontinue the operation of the signal after the turn has been completed.

The above and other objects may be attained by employing this invention which embodies among its features a hollow hub adapted to be attached to the steering shaft of a vehicle, spokes carried by the hub for movement therewith and extending diametrically outwardly therefrom, a steering wheel carried by the spokes for movement therewith in concentric spaced relation to the hub, rock shafts mounted on the spokes and extending into the hub, said rock shafts being rotatable about their longitudinal axes, fingers carried by the rock shafts for movement therewith in arcuate paths within the hub, plungers mounted in the hub for movement therethrough in rectilinear paths which lie parallel to the steering shaft and intersect the arcuate paths, contacts carried by the plungers for movement therewith in rectilinear paths below the hub, conductor bars carried by the steering column below the hub and intersecting the rectilinear paths, said conductor bars being electrically connected to a source of electrical energy and to turn signals carried by the vehicle, and actuating levers carried by the rock shafts and extending downwardly therefrom adjacent the steering wheel for engagement by the finger of the operator of the vehicle to set a signal in operation without removing his hand from the steering wheel.

Other features include yielding means carried by the hub and operatively engaging the plungers for elevating the plungers and yieldingly holding the contacts out of engagement with the conductor bars, and stops carried by the rock shafts within the hub for movement with said rock shafts to engage the hub and arrest upward movement of the fingers beyond a predetermined position above the plungers.

In the drawings:

Figure 3 is a fragmentary top plan view of the switch with the hub cover removed;

Figure 4 is a horizontal sectional view taken substantially on the line 4—4 of Figure 2;

Figure 5 is a top plan view of the plate showing the conductor bars in place therein;

Figure 6 is a sectional view taken substantially on the line 6—6 of Figure 5;

Figure 7 is a vertical sectional view on a somewhat reduced scale taken substantially on the line 7—7 of Figure 2; and Figure 8 is a fragmentary perspective view of one of the spokes of the steering wheel.

Figure 1:
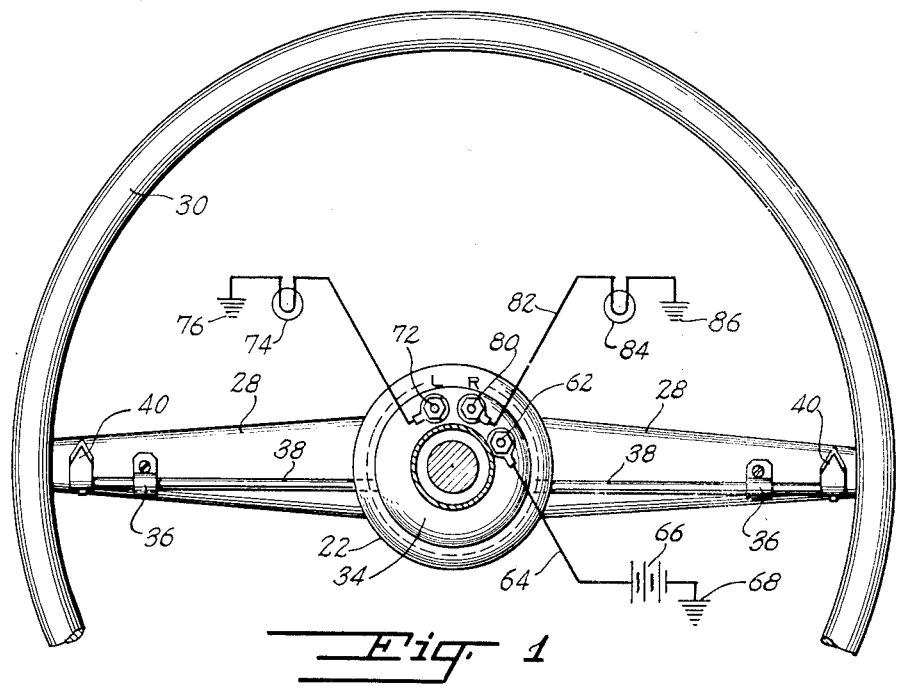
Figure 1 is a fragmentary bottom plan view of a steering post and steering shaft equipped with this improved turn signal switch.

Referring to the drawings in detail, a conventional steering shaft 10 is housed within a conventional steering column 12 and carries at its upper end externally screw threaded extension 14 which cooperates with a nut 16 in retaining this improved turn signal switch in place on the vehicle. The steering column 12 is provided adjacent its upper end with diametrically opposed internally screw threaded openings 18, the purpose of which will hereinafter appear.

Figure 2:
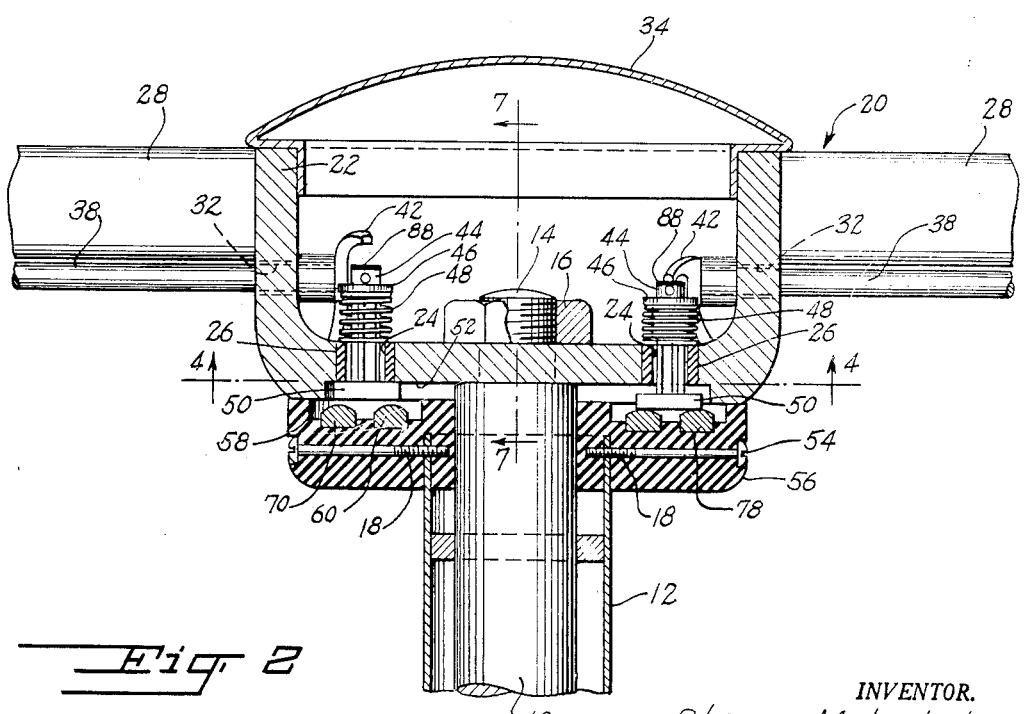
Figure 2 is a fragmentary enlarged sectional view through the turn signal switch and taken substantially on the line 2—2 of Figure 4.

My improved turn signal switch designated generally 20 comprises a hollow hub 22 which, as illustrated in Figure 2, is adapted to be attached to the steering shaft 10 by the nut 16 so as to turn with the steering shaft. Extending through the bottom wall of the hub 22 on opposite sides of the steering shaft 10 are openings 24 in which are seated bushings 26 of nonconducting material. Carried by the hub 22 and extending diametrically outwardly therefrom are spokes 28 carrying at their ends remote from the hub 22 a steering wheel rim 30 which lies concentric about the hub, as will be readily understood upon reference to Figure 1. Extending through the side wall of the hub 22 beneath each spoke 28 are aligned openings 32, the purpose of which will hereinafter appear.

A suitable cover 34 is adapted to close the open upper end of the hollow hub 22, as will be readily understood upon reference to the drawings.

Secured to the spokes 28 adjacent the outer ends thereof are bearing sleeves 36 which align axially with the openings 32, and mounted for rocking movement in the openings 32 and bearing sleeves 36 and rock shafts 38 carrying adjacent their outer ends control levers 40 which extend downwardly therefrom below the spokes 28 adjacent the wheel rim 30. It will thus be seen that the user may press one or the other of the levers 40 to rock its respective shaft 38 without removing his hand from the steering wheel. Carried by the rock shafts 38 adjacent their inner ends for rocking movement within the hub 22 are pressure fingers 42 which are fixed to the rock shafts for movement in arcuate paths within the interior of the hub 22. It is to be noted that the fingers 42 move in arcuate paths which intersect the axes of the bushings 26.

Mounted for vertical sliding movement through the bushings 26 and in parallel relation to the steering shaft 10 are plungers 44 carrying adjacent their upper ends stops 46 against which bear the upper ends of compression coil springs 48, the lower ends of which bear on the bushings 26 so as to yieldingly urge the plungers upwardly in their respective bushings. Contacts 50 are carried by the lower ends of the plungers 44 and are normally withdrawn upwardly under the influence of the springs 48 into an annular recess 52 which opens through the bottom of the hub 22.

Mounted on the steering column 12 immediately below the hub 22 and secured in place by screws 54, which threadedly engage the openings 18, is a plate 56 of nonconducting material which plate is provided in its upper surface with an annular groove 58 which opens through the top of the plate, as will be readily understood upon reference to Figure 2.

Seated in the plate 56 and extending into the groove 58 is a conductor ring 60 carrying a lug 62 which extends through the bottom of the plate 56 and has connected thereto a conductor 64 which leads to one terminal of a power source 66 such as the battery of the vehicle, the opposite terminal of which is grounded as at 68.

A conductor bar 70 is carried by the plate 56 and extends into the groove 58 in concentric spaced relation to the conductor bar 60 and carries at one end a connection stud 72 which is connected to one terminal of a turn signal lamp 74, the opposite terminal of which is grounded as at 76. It is to be noted that the conductor bar 70 extends substantially half-way around the plate 56 in spaced concentric relation to the conductor bar 60 so that when the rock shaft 38 on the left hand side of the hub 22 is moved to depress the plunger 44, the contact 50 on the left hand side of the hub will be moved into contact with the bars 60 and 70 to complete the electrical circuit through the lamp 74.

A curved conductor bar 78 is mounted in the plate 56 and projects into the annular recess 58, and this conductor bar 78 lies in spaced concentric relation to the conductor bar 60 and is coupled through a suitable post 80 and conductor 82 with one terminal of a signal lamp 84, the opposite terminal of which is grounded as at 86. It will thus be seen that when the rock shaft 38 on the right hand side of the hub 22 is moved in its arcuate path, the plunger 44 on the right hand side of the hub 22 will be depressed to move the contact 50 on the right hand side of the plate 56 into engagement with the conductor bars 60 and 78 to complete the signaling circuit through the lamp 84 so as to illuminate it. It will be understood, of course, that where so required, the upper ends of the plungers 44 are provided with pads 88 of nonconducting material so as to avoid short circuiting the device through the contact fingers 42.

Secured to the shafts 38 adjacent the fingers 42 and extending outwardly from the shafts 38 within the hub 22 for movement with the shaft in vertical arcuate paths which intersect the bottom wall of the hub are stops 90 which are adapted to engage the bottom wall of the hub 22 to arrest movement of the shafts 38 in one direction.

In use, it will be evident that when the driver of a vehicle equipped with this improved turn signal switch desires to make a turn, one finger of one hand is pressed against the actuating lever 40 on the side of the steering wheel 30 toward which the turn is to be made to rock the rock shaft 38 and move the plunger 44 on that particular side of the hub 22 to cause the contact carried by the plunger to bridge the gap between the conductor bars 60, 70 or 78, according to which of the shafts 38 is rocked. The bridging of the conductor bars 60 and 70 will complete an electrical signaling circuit through the lamp or lamps 74 to indicate the making of a left hand turn, whereas when the conductor bars 60 and 78 are bridged by a contact 50 on the opposite side of the hub 22, the signaling lamp or lamps 84 will be illuminated to indicate the intention of the driver to make a right hand turn.

From the foregoing, it will be evident that the control of the turn signals is disposed directly within the control of the driver of the vehicle without requiring the removal of his hands from the steering wheel.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. A switch for attachment to a motor vehicle comprising a hollow hub adapted to be attached to the steering shaft of a vehicle, spokes carried by the hub for movement therewith and extending diametrically outwardly therefrom, a steering wheel carried by the spokes for movement therewith in concentric spaced relation to the hub, rock shafts mounted on the spokes and extending into the hub, said rock shafts being rotatable about their longitudinal axes, fingers carried by the rock shafts for movement therewith in arcuate paths within the hub, plungers mounted in the hub for movement therethrough in rectilinear paths which lie parallel to the steering shaft and intersect the arcuate paths, contacts carried by the plungers for movement therewith in rectilinear paths below the hub, conductor bars carried by the steering column below the hub and intersecting the rectilinear paths, actuating levers carried by the rock shafts and extending downwardly therefrom adjacent the steering wheel, and yielding means carried by the hub and operatively engaging the plungers for elevating the plungers and yieldingly holding the contacts out of engagement with the conductor bars.

2. A switch for attachment to a motor vehicle comprising a hollow hub adapted to be attached to the steering shaft of a vehicle, spokes carried by the hub for movement therewith and extending diametrically outwardly therefrom, a steering wheel carried by the spokes for movement therewith in concentric spaced relation to the hub, rock shafts mounted on the spokes and extending into the hub, said rock shafts being rotatable about their longitudinal axes, fingers carried by the rock shafts for movement therewith in arcuate paths within the hub, plungers mounted in the hub for movement therethrough in rectilinear paths which lie parallel to the steering shaft and intersect the arcuate paths, contacts carried by the plungers for movement therewith in rectinlinear paths below the hub, conductor bars carried by the steering column below the hub and intersecting the rectilinear paths, actuating levers carried by the rock shafts and extending downwardly therefrom adjacent the steering wheel, and stops carried by the rock shafts within the hub for movement with said shafts to arrest upward movement of the fingers beyond a predetermined position above the plungers.

References Cited in the file of this patent

UNITED STATES PATENTS

| | | |
|---|---|---|
| 1,490,005 | Glass | Apr. 8, 1924 |
| 1,568,744 | Kronewitter | Jan. 5, 1926 |
| 1,651,540 | Park | Dec. 6, 1927 |
| 1,792,713 | Schmelzkopf | Feb. 17, 1931 |
| 1,856,588 | Peterson | May 3, 1932 |
| 1,879,936 | Ivandick | Sept. 27, 1932 |
| 2,257,659 | Thompson | Sept. 30, 1941 |
| 2,291,159 | Jacobi | July 28, 1942 |
| 2,476,487 | Frank | July 19, 1949 |
| 2,578,423 | Harstine | Dec. 11, 1951 |